(12) United States Patent
Kim et al.

(10) Patent No.: US 12,474,678 B2
(45) Date of Patent: Nov. 18, 2025

(54) ATTITUDE ADJUSTMENT APPARATUS AND METHOD

(71) Applicant: Hanwha Vision Co., Ltd., Seongnam-si (KR)

(72) Inventors: Chang Yeon Kim, Seongnam-si (KR); Won Joon Kong, Seongnam-si (KR); Kyoung Jae Lee, Seongnam-si (KR)

(73) Assignee: HANWHA VISION CO., LTD., Seongnam-si (KR)

( * ) Notice: Subject to any disclaimer, the term of this patent is extended or adjusted under 35 U.S.C. 154(b) by 171 days.

(21) Appl. No.: 18/534,148

(22) Filed: Dec. 8, 2023

(65) Prior Publication Data

US 2025/0076827 A1    Mar. 6, 2025

(30) Foreign Application Priority Data

Sep. 5, 2023    (KR) .................. 10-2023-0117330

(51) Int. Cl.
*G05B 13/02*    (2006.01)

(52) U.S. Cl.
CPC .................. *G05B 13/024* (2013.01)

(58) Field of Classification Search
CPC ............ G03B 17/561; H04N 23/695; H02K 11/215; H02K 49/102; G01B 7/30;
(Continued)

(56) References Cited

U.S. PATENT DOCUMENTS 9,094,591 B2    7/2015    Codd et al.
11,411,472 B2   8/2022    Chen
(Continued)

FOREIGN PATENT DOCUMENTS

CN    114649909 A    6/2022
JP    2003-333371 A   11/2003
(Continued)

OTHER PUBLICATIONS

Communication dated Nov. 22, 2024, issued by the Swedish Intellectual Property Office in Swedish Application No. 2450489-6.
(Continued)

*Primary Examiner* — Roberto Velez
(74) *Attorney, Agent, or Firm* — Sughrue Mion, PLLC

(57) ABSTRACT

Embodiments of the present disclosure relate to an attitude adjustment apparatus and method capable of adjusting attitude of a target object. An attitude adjustment apparatus includes a base part, a first part rotatably coupled to the base part, a second part fixedly coupled to a target object and rotatably coupled to the first part, and a controller adjusts an attitude of the target object by controlling the rotation of the first and second parts, wherein the base part and the first part include motors, which generate driving force, sensing portions, which generate a magnetic field and detects changes in the magnetic field, and targets, which are rotated by the driving force from the motors and include blades that change the generated magnetic field. The controller determines a rotation angle of the motors by referencing identification information of reference blades, among the blades, and sensing results from the sensing portions.

20 Claims, 21 Drawing Sheets

(58) Field of Classification Search
CPC ........ G01R 33/02; G01R 15/20; G01R 21/08; G01R 33/07; G01D 5/142
USPC .......................... 324/207.13, 207.2, 207.25
See application file for complete search history.

(56) References Cited

U.S. PATENT DOCUMENTS

| | | |
|---|---|---|
| 2002/0030488 A1 | 3/2002 | Ito |
| 2021/0289124 A1 | 9/2021 | Kim et al. |
| 2022/0205620 A1 | 6/2022 | Jiang |
| 2022/0308601 A1* | 9/2022 | Yamamoto ........... F16M 11/123 |
| 2024/0004274 A1 | 1/2024 | Kim et al. |

FOREIGN PATENT DOCUMENTS

| | | |
|---|---|---|
| KR | 10-2015-0044501 A | 4/2015 |
| KR | 10-2175887 B1 | 11/2020 |
| TW | M582751 U | 8/2019 |
| WO | 2019/017286 A1 | 1/2019 |
| WO | 2022/044484 A1 | 3/2022 |
| WO | 2023/286521 A1 | 1/2023 |
| WO | 2024/005287 A1 | 1/2024 |

OTHER PUBLICATIONS

Communication dated Mar. 28, 2025, issued by the German Patent Office in German Application No. 10 2023 134 267.3.
Brajon., "Development of a hybrid magnetic-inductive angular sensor with 360° range and stray field immunity", 2020, https://webthesis.biblio.polito.it/secure/16017/1/tesi.pdf, pp. 1-91 (105 pages total).

\* cited by examiner

10

140, 250

140, 250

140, 250

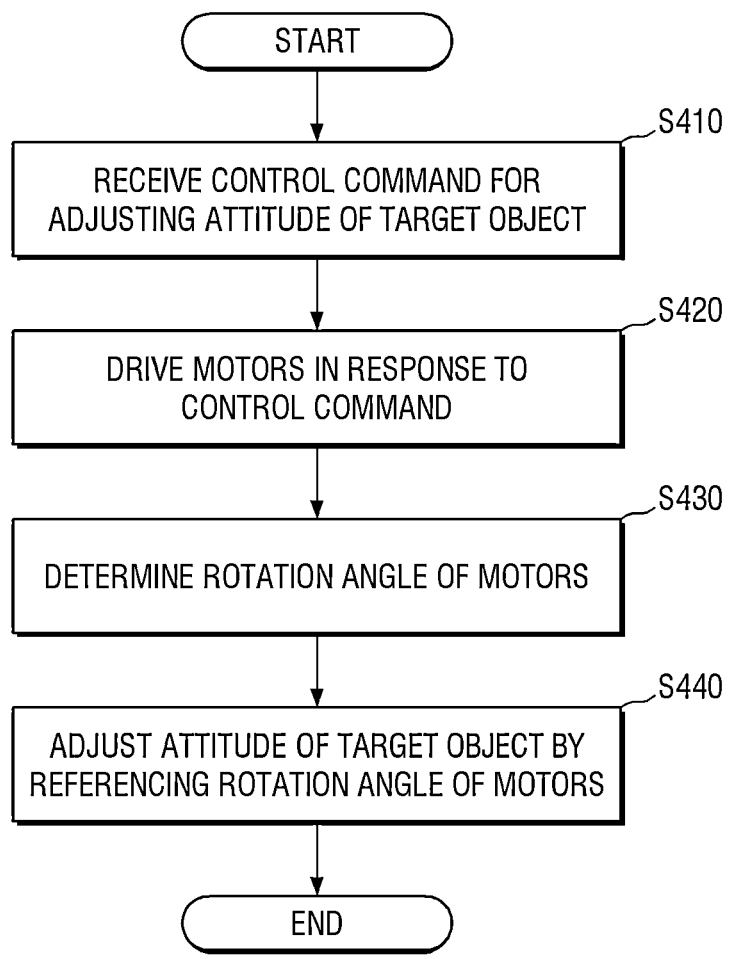

ATTITUDE ADJUSTMENT APPARATUS AND METHOD

CROSS-REFERENCE TO RELATED APPLICATION

This application is based on and claims priority under 35 U.S.C. § 119 to Korean Patent Application No. 10-2023-0117330, filed on Sep. 5, 2023, in the Korean Intellectual Property Office, the contents of which are herein incorporated by reference in its entirety.

BACKGROUND

1. Field

Embodiments of the present disclosure relate to an attitude adjustment apparatus and method, and more particularly, to an attitude adjustment apparatus and method capable of adjusting the attitude of a target object through feedback control.

2. Description of the Related Art

Cameras can be used for the purpose of monitoring a targeted location. Users can perform surveillance on the targeted location by referring to images captured by the cameras.

When a camera is pointing at only one spot, a surveillance area may be limited. Therefore, pan-tilt equipment can be attached to the camera to switch a shooting direction of the camera. The pan-tilt equipment can switch the shooting direction either upon the user's request or automatically, and the camera can execute shooting in the switched direction.

A hall sensor may be used to detect a rotation angle of a motor equipped in the pan-tilt equipment. The hall sensor can detect magnetic fields to sense the rotation angle of the motor. The detected rotation angle of the motor by the hall sensor can be referred to for motor rotation control.

Meanwhile, there is an increasing need for precise control over the camera's surveillance area switching. Therefore, there is a demand for a solution that enables more accurate detection of the motor's rotation angle.

SUMMARY

According to embodiments of the present disclosure, an attitude adjustment apparatus and method capable of adjusting the attitude of a target object through feedback control is provided.

According to embodiments of the present disclosure, an attitude adjustment apparatus is provided and includes: a base part: a first rotating part rotatably coupled to the base part: a second rotating part configured to be fixedly coupled to a target object and rotatably coupled to the first rotating part; and a controller configured to adjust an attitude of the target object by controlling rotation of the first rotating part and the second rotating part. The base part includes: a first motor configured to generate a first driving force: a first sensing portion including a sensor, the first sensing portion configured to generate a first magnetic field and detect changes in the first magnetic field; a first target that is configured to be rotated by the first driving force of the first motor, the first target including a plurality of first blades that are configured to change the first magnetic field generated by the first sensing portion. The first rotating part includes: a second motor configured to generate a second driving force: a second sensing portion including a sensor, the second sensing portion configured to generate a second magnetic field and detect changes in the second magnetic field: a second target that is configured to be rotated by the second driving force of the second motor, the second target including a plurality of second blades that are configured to change the second magnetic field generated by the second sensing portion. The controller is further configured to: determine a rotation angle of the first motor based on sensing results from the first sensing portion and identification information of a first reference blade, from among the plurality of first blades, that is causing the changes in the first magnetic field; and determine a rotation angle of the second motor based on sensing results from the second sensing portion and identification information of a second reference blade, from among the plurality of second blades, that is causing the changes in the second magnetic field.

According to an embodiment of the present disclosure, the sensor of the first sensing portion is a first magnetic field sensor configured to sense the changes in the first magnetic field caused by the plurality of first blades, and sequentially output first sensor values respectively obtained for the plurality of first blades, the sensor of the second sensing portion is a second magnetic field sensor configured to sense the changes in the second magnetic field caused by the plurality of second blades and sequentially output second sensor values respectively obtained for the plurality of second blades, the first sensing portion further includes a first coil configured to generate the first magnetic field, and a first board that fixes the first coil and the first magnetic field sensor, and the second sensing portion further includes a second coil configured to generate the second magnetic field, and a second board that fixes the second coil and the second magnetic field sensor.

According to an embodiment of the present disclosure, the first sensor values obtained for the plurality of first blades respectively correspond to different first partial angle ranges of a first rotation angle range of the first motor, each of the first partial angle ranges corresponds to a respective one of the plurality of first blades, the second sensor values obtained for the plurality of second blades respectively correspond to different second partial angle ranges of a second rotation angle range of the second motor, each of the second partial angle ranges corresponds to a respective one of the plurality of second blades, and the controller is further configured to: determine one of the first partial angle ranges, that corresponds to the first reference blade, as a reference angle range for determining the rotation angle of the first motor; and determine one of the second partial angle ranges, that corresponds to the second reference blade, as a reference angle range for determining the rotation angle of the second motor.

According to an embodiment of the present disclosure, the controller is further configured to: calculate a plurality of first predicted rotation angles of the first motor based on a third sensor value output by the first magnetic field sensor, and determine one of the plurality of first predicted rotation angles as the rotation angle of the first motor, each of the plurality of first predicted rotation angles being within a respective one of the first partial angle ranges: an calculate a plurality of second predicted rotation angles of the second motor based on a fourth sensor value output by the second magnetic field sensor, and determine one of the plurality of second predicted rotation angles as the rotation angle of the second motor, each of the plurality of second predicted rotation angles being within a respective one of the second partial angle ranges.

According to an embodiment of the present disclosure, the first sensing portion further includes a first photo interrupter sensor that is fixed to the first board and configured to identify an initial angle of the first motor, and the second sensing portion further includes a second photo interrupter sensor that is fixed to the second board and configured to identify an initial angle of the second motor.

According to an embodiment of the present disclosure, the first target includes a first interrupter that is configured to be detected by the first photo interrupter sensor, and the second target includes a second interrupter that is configured to be detected by the second photo interrupter sensor.

According to an embodiment of the present disclosure, the controller is further configured to: receive a first target rotation angle of the first motor, and control the first motor to rotate to the first target rotation angle based on the initial angle of the first motor; and receive a second target rotation angle of the second motor, and control the second motor to rotate to the second target rotation angle based on the initial angle of the second motor.

According to an embodiment of the present disclosure, the first target of the base part is coupled to the first rotating part, and the second target of the first rotating part is coupled to the second rotating part.

According to an embodiment of the present disclosure, a rotation axis of the first target of the base part coincides with a rotation axis of the first rotating part, and a rotation axis of the second target of the first rotating part coincides with a rotation axis of the second rotating part.

According to an embodiment of the present disclosure, the base part includes a base cover, the first rotating part includes a rotating panel that is configured to rotate on the base cover, and the first target of the base part is coupled to the rotating panel.

According to an embodiment of the present disclosure, the first motor of the base part is configured to rotate the first rotating part with the first driving force, and the second motor of the first rotating part is configured to rotate the second rotating part with the second driving force.

According to an embodiment of the present disclosure, a rotation axis of the first rotating part and a rotation axis of the second rotating part are in different directions from each other.

According to an embodiment of the present disclosure, the first rotating part is configured to infinitely rotate relative to the base part, and the second rotating part is configured to rotate only within a predetermined angle range relative to the first rotating part.

According to an embodiment of the present disclosure, the second rotating part is a housing that is configured to accommodate the target object.

According to embodiments of the present disclosure, an attitude adjustment method for adjusting attitude of a target object of an attitude adjustment apparatus is provided and includes: receiving a control command for adjusting the attitude of the target object; and adjusting the attitude of the target object by controlling, in response to the control command, rotation of a first rotating part of the attitude adjustment apparatus, relative to a base part of the attitude adjustment apparatus, and a second rotating part of the attitude adjustment apparatus, relative to the first rotating part. The base part is coupled to the second rotating part. The base part includes: a first motor configured to generate a first driving force: a first sensing portion including a sensor, the first sensing portion configured to generate a first magnetic field and detect changes in the first magnetic field; and a first target that is configured to be rotated by the first driving force of the first motor, the first target including a plurality of first blades that are configured to change the first magnetic field generated by the first sensing portion. The first rotating part includes: a second motor configured to generate a second driving force: a second sensing portion including a sensor, the second sensing portion configured to generate a second magnetic field and detect changes in the second magnetic field; and a second target that is configured to be rotated by the second driving force of the second motor, the second target including a plurality of second blades that are configured to change the second magnetic field generated by the second sensing portion. The adjusting the attitude of the target object includes: determining a rotation angle of the first motor based on sensing results from the first sensing portion and identification information of a first reference blade, from among the plurality of first blades, that is causing the changes in the first magnetic field; and determining a rotation angle of the second motor based on sensing results from the second sensing portion and identification information of a second reference blade, from among the plurality of second blades, that is causing the changes in the second magnetic field.

According to an embodiment of the present disclosure, the sensor of the first sensing portion is a first magnetic field sensor configured to sense the changes in the first magnetic field caused by the plurality of first blades, and sequentially output first sensor values respectively obtained for the plurality of first blades, the sensor of the second sensing portion is a second magnetic field sensor configured to sense the changes in the second magnetic field caused by the plurality of second blades and sequentially output second sensor values respectively obtained for the plurality of second blades, the first sensing portion further includes a first coil configured to generate the first magnetic field, and a first board that fixes the first coil and the first magnetic field sensor, and the second sensing portion further includes a second coil configured to generate the second magnetic field, and a second board that fixes the second coil and the second magnetic field sensor.

According to an embodiment of the present disclosure, the first sensor values obtained for the plurality of first blades respectively correspond to different first partial angle ranges of a first rotation angle range of the first motor, each of the first partial angle ranges corresponds to a respective one of the plurality of first blades, the second sensor values obtained for the plurality of second blades respectively correspond to different second partial angle ranges of a second rotation angle range of the second motor, each of the second partial angle ranges corresponds to a respective one of the plurality of second blades, and the adjusting the attitude of the target object further includes: determining one of the first partial angle ranges, that corresponds to the first reference blade, as a reference angle range for determining the rotation angle of the first motor; and determining one of the second partial angle ranges, that corresponds to the second reference blade, as a reference angle range for determining the rotation angle of the second motor.

According to an embodiment of the present disclosure, the adjusting the attitude of the target object further includes: calculating a plurality of first predicted rotation angles of the first motor based on a third sensor value output by the first magnetic field sensor, and determine one of the plurality of first predicted rotation angles as the rotation angle of the first motor, each of the plurality of first predicted rotation angles being within a respective one of the first partial angle ranges; and calculating a plurality of second predicted rotation angles of the second motor based on a fourth sensor value output by the second magnetic field sensor, and determine one of the plurality of second predicted rotation angles as the rotation angle of the second motor, each of the plurality of second predicted rotation angles being within a respective one of the second partial angle ranges.

According to an embodiment of the present disclosure, the first sensing portion further includes a first photo interrupter sensor that is fixed to the first board and configured to identify an initial angle of the first motor, and the second sensing portion further includes a second photo interrupter sensor that is fixed to the second board and configured to identify an initial angle of the second motor.

According to an embodiment of the present disclosure, the adjusting the attitude of the target object further includes: receiving a first target rotation angle of the first motor, and controlling the first motor to rotate to the first target rotation angle based on the initial angle of the first motor; and receiving a second target rotation angle of the second motor, and controlling the second motor to rotate to the second target rotation angle based on the initial angle of the second motor.

According to the aforementioned and other embodiments of the present disclosure, as the attitude adjustment apparatus and method can detect the rotation angle of a motor without determining the position of a blade, there is an advantage of enabling attitude adjustment of a target object with a relatively low computational load.

However, aspects and effects of embodiments of the present disclosure are not restricted to those set forth above. The above and other aspects and effects of embodiments of the present disclosure will become more apparent to one of ordinary skill in the art to which the present disclosure pertains by referencing the detailed description of the present disclosure given below.

BRIEF DESCRIPTION OF DRAWINGS

The above and other aspects and features of the present disclosure will become more apparent by describing in detail non-limiting example embodiments thereof with reference to the attached drawings, in which:

FIG. 21 is a flowchart illustrating an attitude adjustment method according to an embodiment of the present disclosure.

DETAILED DESCRIPTION

Figure 1:
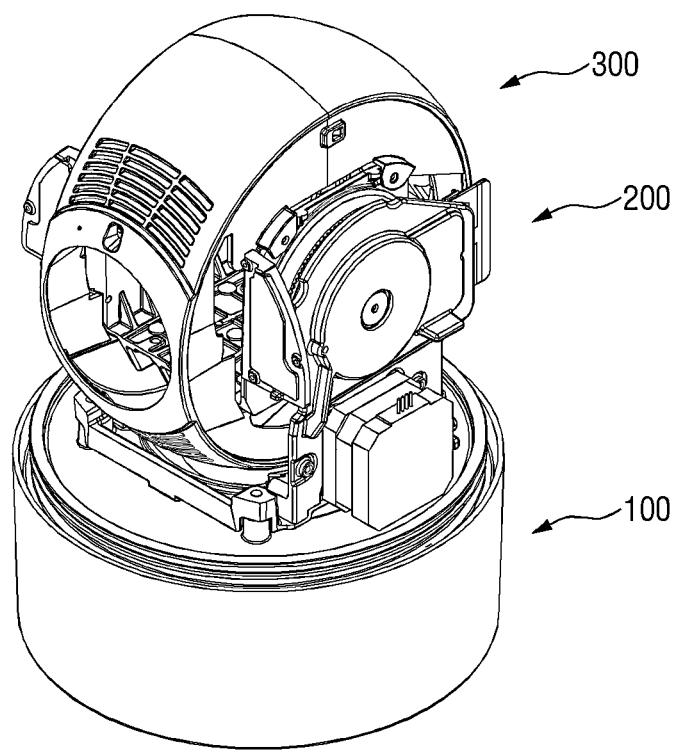
FIG. 1 is a perspective view of an attitude control apparatus according to an embodiment of the present disclosure.

Hereinafter, non-limiting example embodiments of the present disclosure will be described in detail with reference to the accompanying drawings. Advantages and features of embodiments of the present disclosure will be apparent with reference to the non-limiting example embodiments described in detail below together with the accompanying drawings. However, the present disclosure is not limited to the example embodiments described below, and embodiments of the present disclosure may be implemented in various different forms. The example embodiments are described to make the present disclosure complete, and to fully inform the scope of the present disclosure to those of ordinary skill in the technical field to which the present disclosure belongs. The same reference numerals refer to the same components throughout the specification.

It will be understood that when an element is referred to as being "on," "connected to," or "coupled to" another element, it can be directly on, connected to, or coupled to the other element or intervening elements may be present. In contrast, when an element is referred to as being "directly on," "directly connected to," or "directly coupled to" another element, there are no intervening elements present.

Unless otherwise defined, all terms (including technical and scientific terms) used in the present specification may have meanings that are commonly understood by those of ordinary skill in the art to which the present disclosure belongs. In addition, terms defined in a commonly used dictionary are not interpreted ideally or excessively unless explicitly defined specifically.

Figure 2:
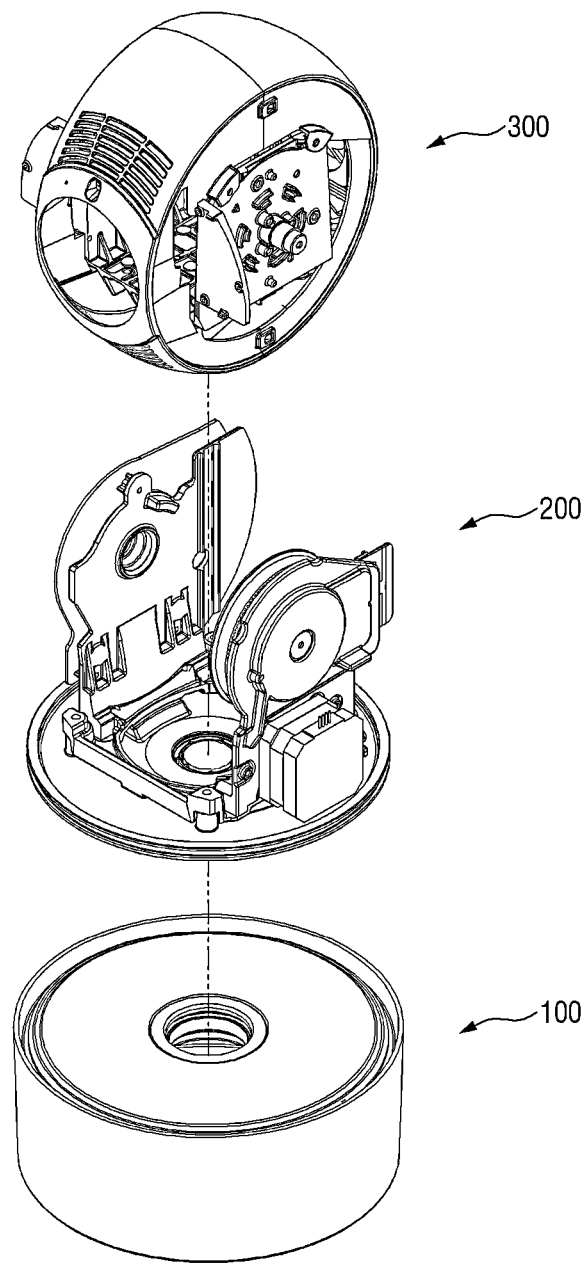
FIG. 2 is an exploded perspective view of the attitude control apparatus according to an embodiment of the present disclosure.
Figure 3:
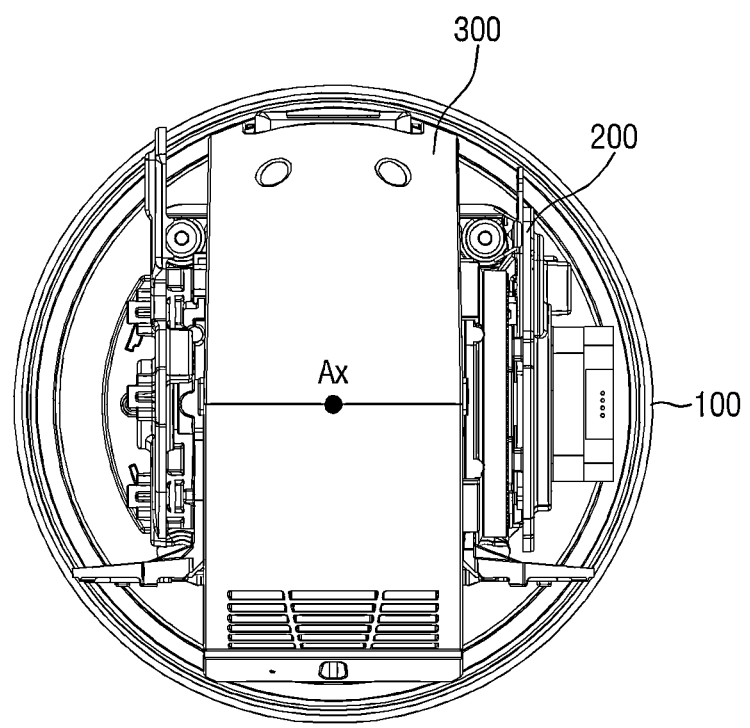
FIG. 3 is a schematic view for explaining rotation of a first rotating part relative to a base part.
Figure 4:
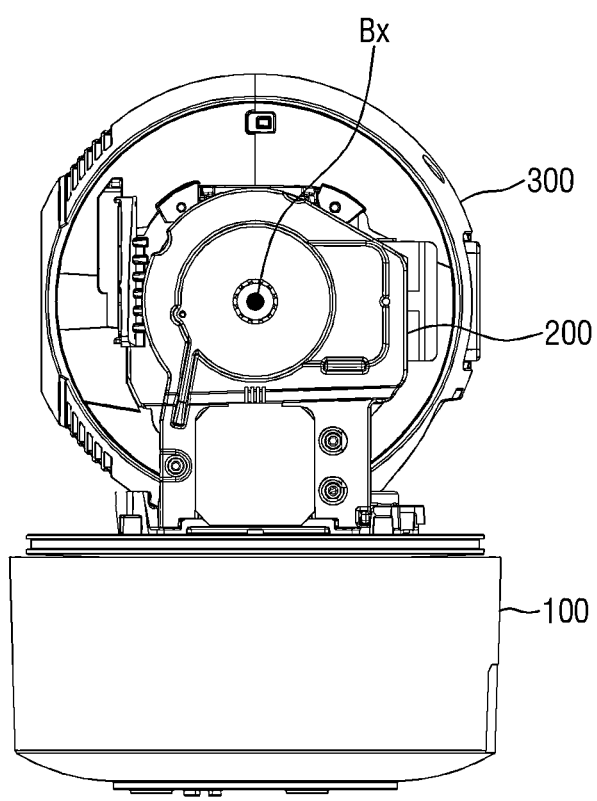
FIG. 4 is a schematic view for explaining rotation of a second rotating part relative to the first rotating part.
Figure 5:
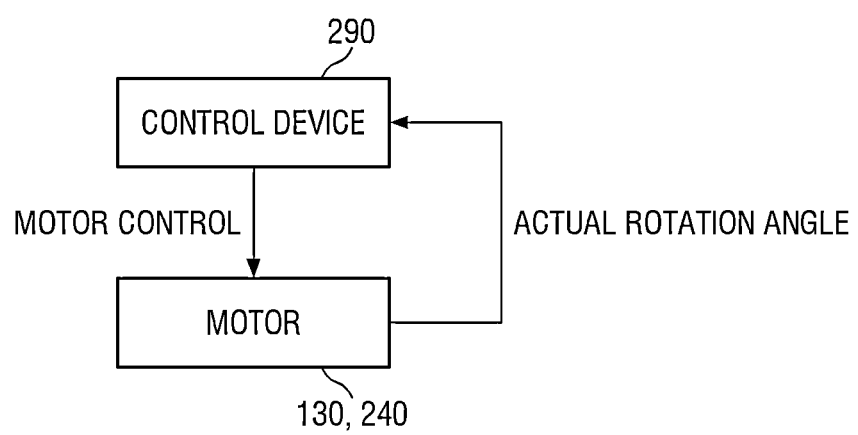
FIG. 5 is a block diagram for explaining the operation of the attitude control apparatus according to an embodiment of the present disclosure.

FIG. 1 is a perspective view of an attitude control apparatus according to an embodiment of the present disclosure, FIG. 2 is an exploded perspective view of the attitude control apparatus according to an embodiment of the present disclosure, FIG. 3 is a schematic view for explaining the rotation of a first rotating part relative to a base part, FIG. 4 is a schematic view for explaining the rotation of a second rotating part relative to the first rotating part, and FIG. 5 is a block diagram for explaining the operation of the attitude control apparatus according to an embodiment of the present disclosure.

Referring to FIGS. 1 and 2, an attitude control apparatus 10 includes a base part 100, a first rotating part 200, and a second rotating part 300.

The base part 100 provides a rotation basis for the first rotating part 200, and the first rotating part 200 may provide a rotation basis for the second rotating part 300. For this purpose, the first rotating part 200 may be rotatably coupled to the base part 100, and the second rotating part 300 may be rotatably coupled to the first rotating part 200.

The second rotating part 300 may be fixedly coupled to a target object (not shown). For example, the second rotating part 300 may be provided in the form of a housing that accommodates the target object.

The attitude of the target object relative to the base part 100 may be adjusted by rotation of the first rotating part 200 and/or the second rotating part 300. For example, the target object may be a camera, and the base part 100 may be fixed to a wall or a ceiling. In this example, the attitude of the camera relative to the wall or ceiling may be adjusted by the rotation of the first rotating part 200 and/or the second rotating part 300. However, the target object being a camera is merely an example, and various other objects requiring attitude adjustment relative to a reference object such as a wall or ceiling may be the target object. For convenience, in the description that follows, it is assumed that the target object is a camera.

Referring to FIG. 3, the first rotating part 200 may rotate relative to the base part 100. The first rotating part 200 may infinitely rotate relative to the base part 100. Specifically, as depicted in FIG. 3, the first rotating part 200 may continuously rotate either clockwise or counterclockwise about a rotation axis Ax.

Referring to FIG. 4, the second rotating part 300 may rotate relative to the first rotating part 200. The second rotating part 300 may rotate within a predetermined angle range relative to the first rotating part 200. Specifically, as depicted in FIG. 4, the second rotating part 300 may rotate either clockwise or counterclockwise about a rotation axis Bx. The clockwise or counterclockwise rotation of the second rotating part 300 may be stopped at a specific point, and after reaching the specific point, rotation may only be performed in the opposite direction. For example, the rotation range of the second rotating part 300 may be 180 degrees.

The rotation axis Ax of the first rotating part 200 and the rotation axis Bx of the second rotating part 300 may be formed differently. For example, the rotation axis Ax of the first rotating part 200 and the rotation axis Bx of the second rotating part 300 may be orthogonal. Due to the different formation of the rotation axes Ax and the rotation axes Bx, various attitudes of the second rotating part 300 relative to the base part 100 can be implemented.

Figure 9:
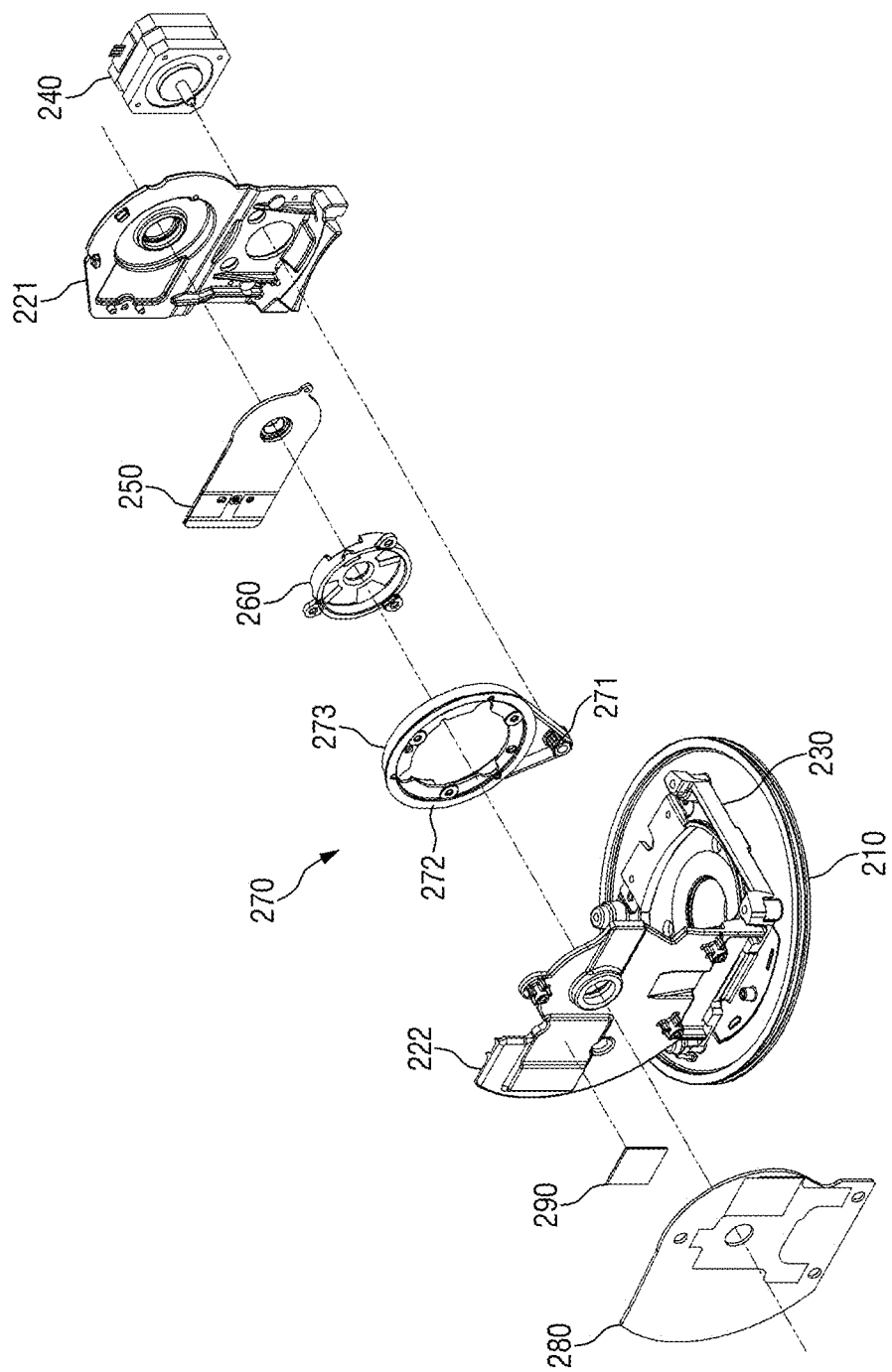
FIG. 9 is an exploded perspective view of the first rotating part.

The attitude control apparatus 10 may include a control device 290 (e.g., a controller) (refer to FIG. 9). The control device 290 may control the rotation of the first rotating part 200 and the second rotating part 300 to adjust the attitude of the target object. The attitude of the target object relative to the base part 100 can be adjusted under the control of the control device 290. If the target object is a camera, the shooting direction of the camera may be adjusted by the control device 290.

According to embodiments of the present disclosure, the control device 290 (e.g., the controller) may comprise at least one processor and memory storing to computer instructions. The computer instructions, when executed by the at least one processor, may be configured to cause the control device 290 to perform its functions.

Figure 7:
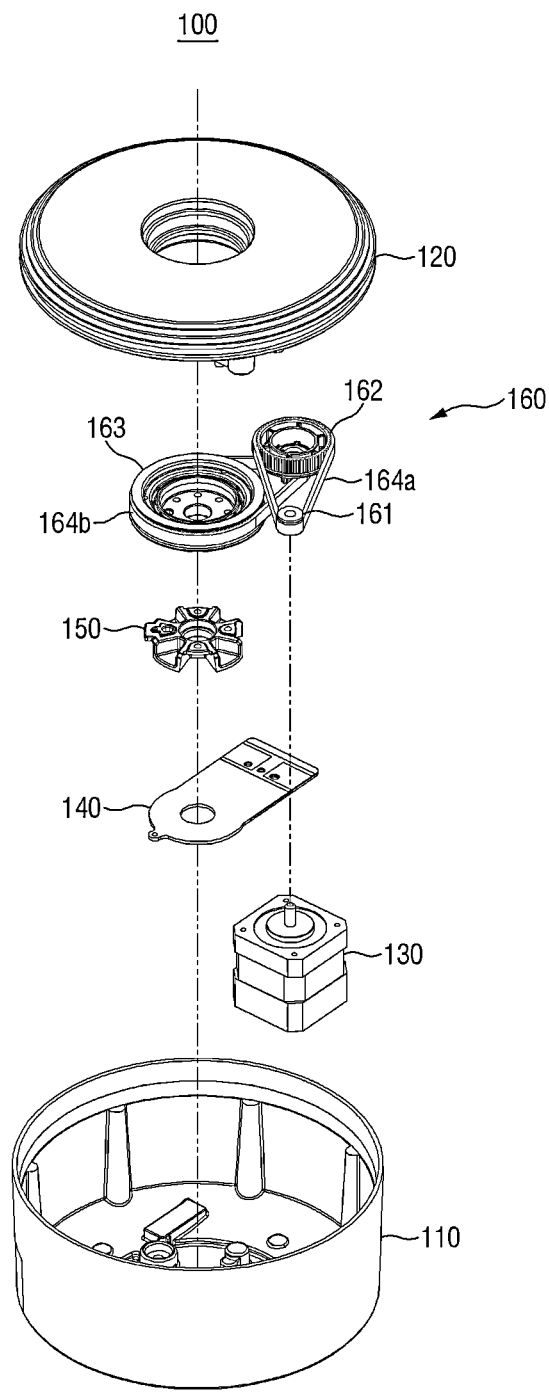
FIG. 7 is an exploded perspective view of the base part.

Referring to FIGS. 7 and 9, the base part 100 and the first rotating part 200 may include a first motor 130 and a second motor 240, respectively, a first sensing portion 140 (e.g., a sensor) and a second sensing portion 250 (e.g., a sensor), respectively, and a first target 150 and a second target 260, respectively. The first motor 130 and the second motor 240 may generate driving force. The first sensing portion 140 and the second sensing portion 250 may generate a magnetic field and detect changes in the generated magnetic field. The first target 150 and the second target 260 may rotate due to the driving force from the first motor 130 and the second motor 240, respectively, and may include multiple blades 151 (refer FIG. 8) and multiple blades 261 (refer FIG. 10), respectively, to change the magnetic field generated by the first sensing portion 140 and the second sensing portion 250, respectively.

The control device 290 may control the first motor 130 and the second motor 240 to control the rotation of the first rotating part 200 and the second rotating part 300. Meanwhile, if an error occurs between the control of the control device 290 and the operation of the first motor 130 and the second motor 240, there may be a discrepancy (hereinafter referred to as "attitude error") between a target attitude and the actual attitude of a target object. The attitude error of the target object may be verified by referencing the rotation angle of the first motor 130 and the second motor 240. Specifically, referring to FIG. 5, the control device 290 may control the first motor 130 and the second motor 240 to rotate to a target rotation angle. Then, the control device 290 may determine the actual rotation angle of the first motor 130 and the second motor 240. If there is a difference between the target rotation angle and the actual rotation angle, an attitude error may occur. In such cases, the control device 290 may control the first motor 130 and the second motor 240 again to correct the attitude error. The attitude of the target object can be finely adjusted through such feedback control of the control device 290.

In determining the rotation angle of the first motor 130 and the second motor 240, the control device 290 may refer to the target rotation angle and sensing results from the first sensing portion 140 and the second sensing portion 250. This will be described later with reference to FIGS. 16-18.

The control device 290 may receive the target rotation angle for the first motor 130 and the second motor 240 and control the first motor 130 and the second motor 240 to rotate to the target rotation angle based on an initial angle. Here, the initial angle may represent the current angle of the first motor 130 and the second motor 240 equipped in the base part 100 or the first rotating part 200.

As will be described below, the rotation angle of the first motor 130 and the second motor 240 may be verified using magnetic field sensors 142 and 252 (refer to FIG. 18). Compared to typical photo interrupter sensors, the magnetic field sensors 142 and 252 can provide higher resolution results and can detect the rotation angle of the first motor 130 and the second motor 240 with relatively high accuracy even if the first motor 130 and the second motor 240 slip. Additionally, the magnetic field sensors 142 and 252 have the advantage of being less expensive and less affected by external factors such as magnetic fields compared to typical magnet sensors.

Figure 6:
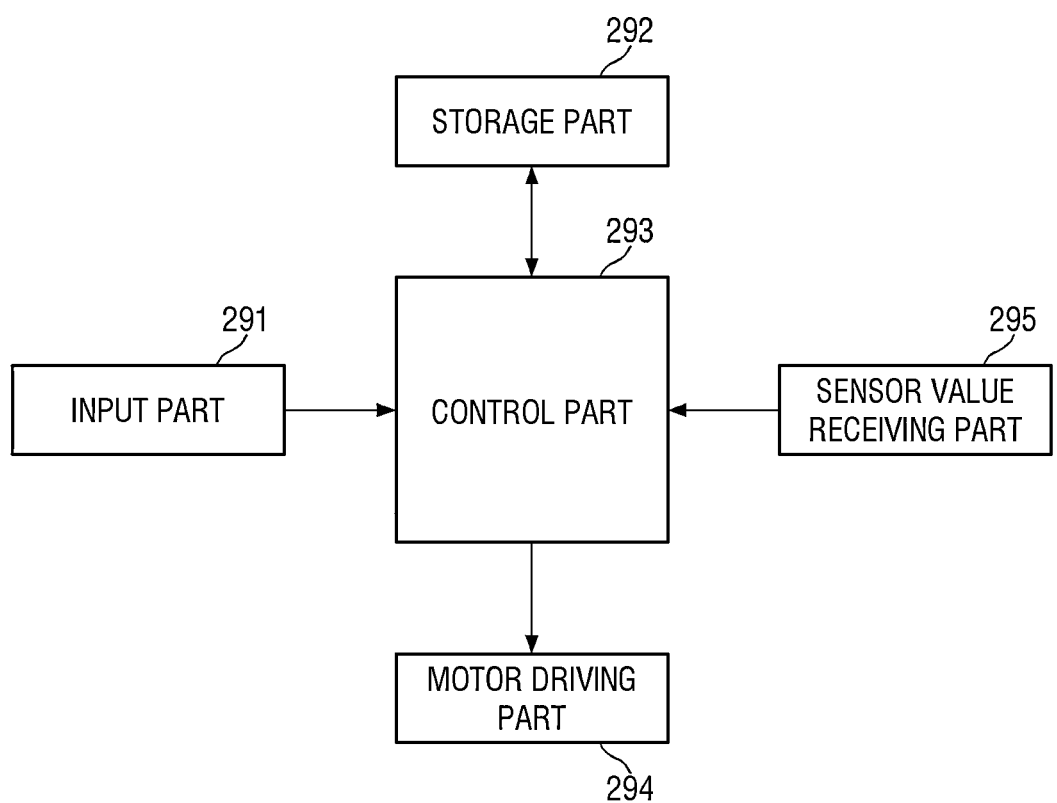
FIG. 6 is a block diagram of a control device.

FIG. 6 is a block diagram of the control device 290.

Referring to FIG. 6, the control device 290 may include an input part 291, a storage part 292 (e.g., a storage), a control part 293 (e.g., at least one processor and memory), a motor driving part 294 (e.g., a motor driver), and a sensor value receiving part 295 (e.g., a receiver).

The input part 291 may receive the target rotation angle. The motor driving part 294 may drive the first motor 130 and the second motor 240 to rotate to the target rotation angle.

The first motor 130 and the second motor 240 may rotate in response to a driving signal received from the motor driving part 294.

The sensor value receiving part 295 can receive sensor values regarding the rotation angle of the first motor 130 and the second motor 240. As will be described below, the base part 100 and the first rotating part 200 may be equipped with sensors to detect the rotation angle of the first motor 130 and the second motor 240, and the sensor value receiving part 295 may receive sensor values from these sensors.

Figure 15:
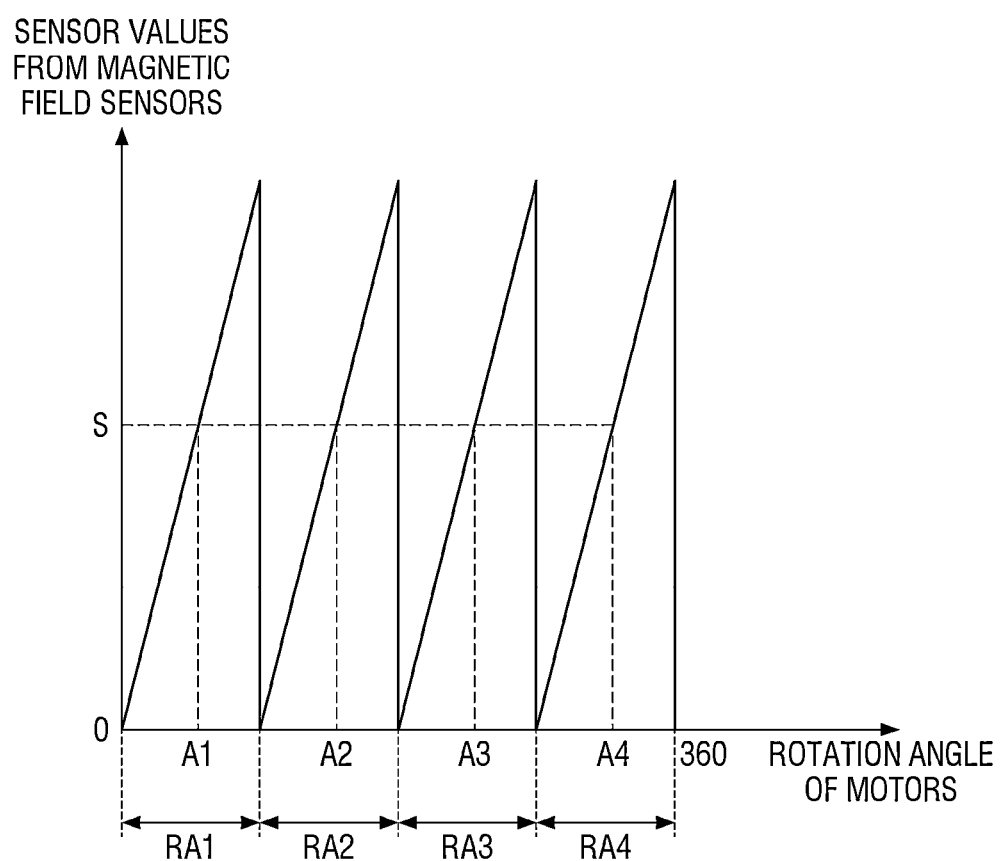
FIG. 15 is a graph showing the relationship between sensor values from magnetic field sensors and the rotation angle of first and second motors.

The storage part 292 may store the relationship between the sensor values and the rotation angle of the first motor 130 and the second motor 240 (hereinafter referred to as the "sensor value-rotation angle relationship"). For example, the storage part 292 may store the sensor value-rotation angle relationship in the form of a graph as shown in FIG. 15.

The control part 293 may confirm the actual rotation angle of the first motor 130 and the second motor 240 by referring to the sensor value-rotation angle relationship. Also, if there is a difference between the target rotation angle and the actual rotation angle, the control part 293 may control the motor driving part 294 to compensate for the difference. Moreover, the control part 293 may perform overall control of the input part 291, the storage part 292, the motor driving part 294, and the sensor value receiving part 295.

Each of the components illustrated in FIG. 6 may include software or hardware such as a field-programmable gate array (FPGA) or application-specific integrated circuit (ASIC), but embodiments of the present disclosure are not limited thereto. The components illustrated in FIG. 6 may be configured to reside in an addressable storage medium and may also be configured to be executed by one or more processors. Functionalities provided by these components may be implemented by further subdivided components, and multiple components may be combined together to implement a single component for performing a particular functionality.

Figure 8:
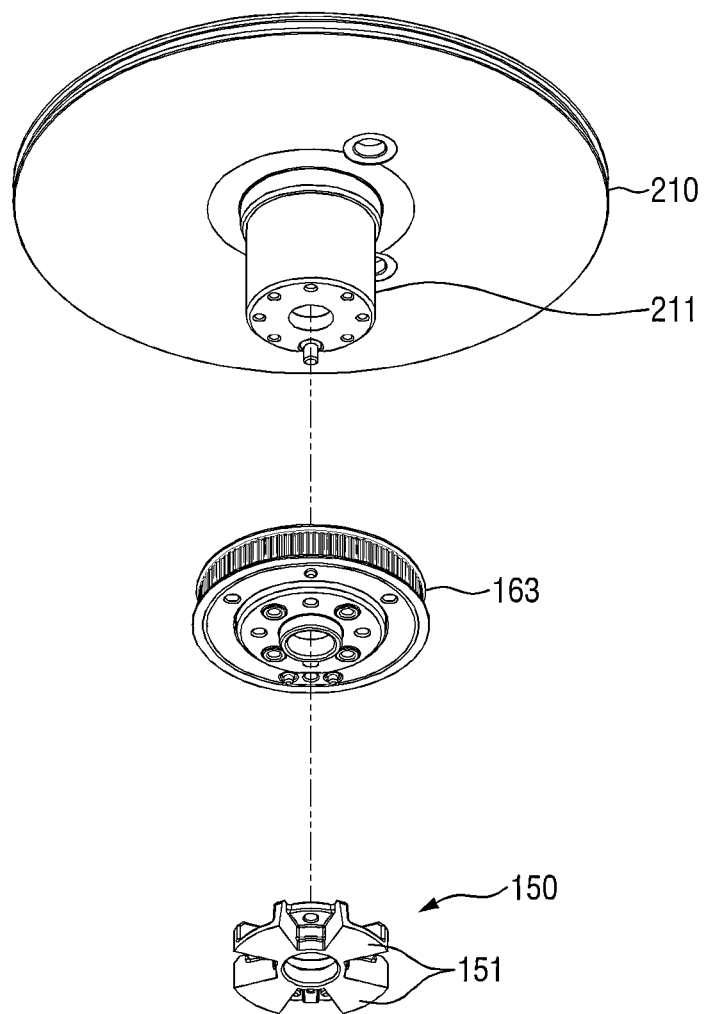
FIG. 8 is an exploded perspective view illustrating how a first target can be coupled to the rotating panel.

FIG. 7 is an exploded perspective view of the base part 100, and FIG. 8 is an exploded perspective view illustrating how the first target 150 can be coupled to a rotating panel 210.

Referring to FIG. 7, the base part 100 may include a base body 110, a base cover 120, the first motor 130, the first sensing portion 140, the first target 150, and a first power transmission portion 160 (e.g., a power transmitter).

The base body 110 may provide an accommodation space for the first motor 130, the first sensing portion 140, the first target 150, and the first power transmission portion 160. An accommodation space may be formed when the base body 110 is combined with the base cover 120. Additionally, the base body 110 may be coupled to a reference object such as a wall or ceiling, to provide a rotational reference for the target object.

The base cover 120 may provide a rotational reference plane for the first rotating part 200. The first rotating part 200 may rotate in a direction parallel to the rotational reference plane while in close contact with the base cover 120.

Referring to FIG. 8, the first target 150 can be coupled to the rotating panel 210 of the first rotating part 200 (of FIG. 9). Here, the rotational axis of the first target 150 may coincide with the rotational axis Ax of the first rotating part 200.

The rotating panel 210 of the first rotating part 200 may include a rotating column 211. A first rotor 163 may be coupled to the rotating column 211, and the first target 150 may be coupled to the first rotor 163. The first target 150 is coupled to the rotating panel 210 by the first rotor 163. As the first rotor 163 is rotated by the first motor 130, the first target 150 may rotate along with the rotating panel 210.

Referring back to FIG. 7, the first motor 130 can generate driving force for the rotation of the first rotating part 200. The first sensing portion 140 may generate a magnetic field and detect changes in the generated magnetic field. The first sensing portion 140 will hereinafter be described with reference to FIGS. 11 and 12.

The first target 150 may be rotated by the driving force of the first motor 130. The driving force of the first motor 130 may be transferred to the first target 150 by the first power transmission portion 160.

The first target 150 may be coupled to the first rotor 163 of the first power transmission portion 160. When the first rotor 163 rotates by the driving force of the first motor 130, the first target 150 may also rotate along with the first rotor 163. The first target 150 may include the blades 151, which change the magnetic field generated by the first sensing portion 140. The blades 151 may be formed of a metal material, for example, aluminum (Al). When the blades 151 move through the magnetic field generated by the first sensing portion 140, the magnetic field may change.

The first power transmission portion 160 transfers the driving force of the first motor 130 to the first rotating part 200 and the first target 150. The first power transmission portion 160 may include a first pinion 161, a transfer gear 162, a first rotor 163, and belts (e.g., a first belt 164a and a second belt 164b).

The first pinion 161 may be rotated by the driving force of the first motor 130. The transfer gear 162 may relay the driving force between the first pinion 161 and the first rotor 163.

The first rotor 163 may be coupled to the first rotating part 200 and the first target 150. As the first rotor 163 rotates, the first rotor 163 enables the rotation of the first rotating part 200 and the first target 150.

The first belt 164a is provided between the first pinion 161 and the transfer gear 162, and the second belt 164b can be provided between the transfer gear 162 and the first rotor 163. The first belt 164a may transfer the rotational force from the first pinion 161 to the transfer gear 162, and the second belt 164b may transfer the rotational force from the transfer gear 162 to the first rotor 163.

Figure 10:
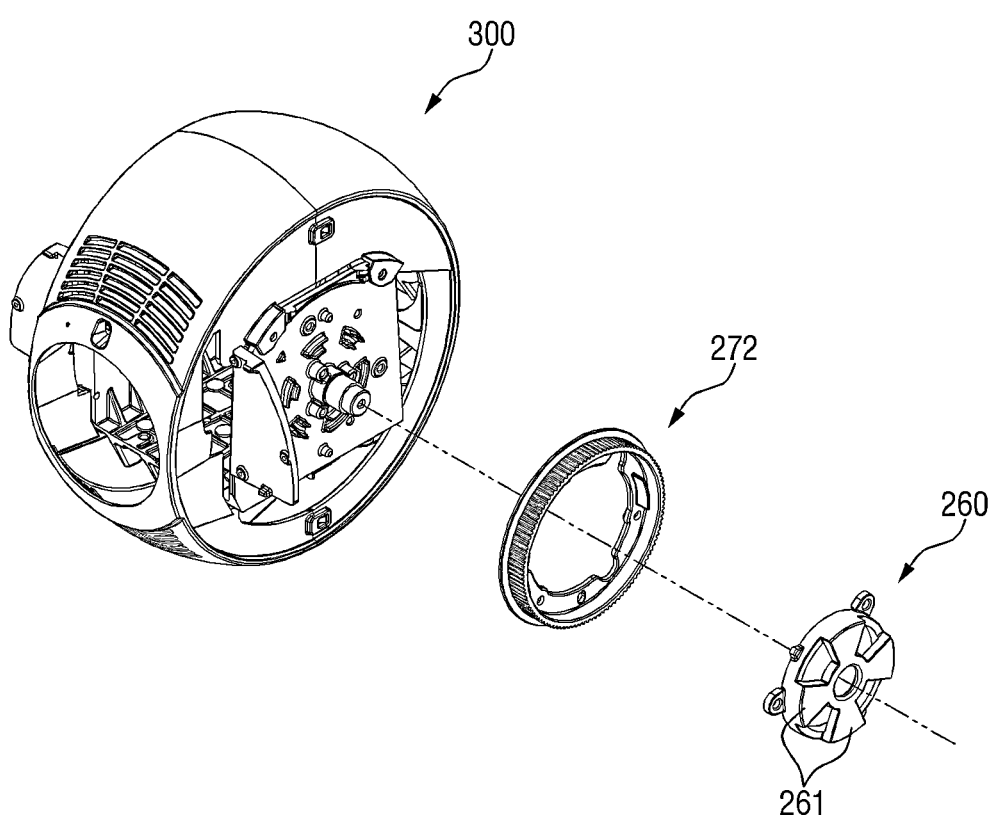
FIG. 10 is an exploded perspective view illustrating how a second target can be coupled to the second rotating part.

FIG. 9 is an exploded perspective view of the first rotating part 200, and FIG. 10 is an exploded perspective view illustrating how the second target 260 can be coupled to the second rotating part 300.

Referring to FIG. 9, the first rotating part 200 may include a rotating panel 210, side frames (e.g., a first side frame 221 and a second side frame 222), the second motor 240, the second sensing portion 250, the second target 260, a second power transmission portion 270 (e.g., a second power transmitter), a main board 280, and the control device 290.

The rotating panel 210 may secure the side frames (e.g., the first side frame 221 and the second side frame 222), the second motor 240, the second sensing portion 250, the second target 260, the second power transmission portion 270, and the main board 280. The side frames (e.g., the first side frame 221 and the second side frame 222), the second motor 240, the second sensing portion 250, the second target 260, the second power transmission portion 270, and the main board 280 may be directly or indirectly coupled to the rotating panel 210. The rotating panel 210 may rotate along the rotational reference plane of the base cover 120. If the rotating panel 210 rotates due to the driving force output from the base part 100, then the side frames (e.g., the first side frame 221 and the second side frame 222), the second motor 240, the second sensing portion 250, the second target 260, the second power transmission portion 270, and the main board 280 may rotate along with the rotating panel 210.

The side frames may include a first side frame 221 and a second side frame 222. The first side frame 221 and the second side frame 222 may be coupled to the rotating panel 210 by a coupling frame 230. The first side frame 221 may be coupled to the second motor 240 and the second sensing portion 250. The second motor 240 and the second sensing portion 250 may both be coupled to the rotating panel 210 by the first side frame 221.

The second motor 240 may generate driving force for the rotation of the second rotating part 300. The second sensing portion 250 may generate a magnetic field and may detect changes in the generated magnetic field. The second sensing portion 250 will hereinafter be described later with reference to FIGS. 11 and 12.

The second target 260 may rotate due to the driving force of the second motor 240. The driving force from the second motor 240 may be transferred to the second target 260 by the second power transmission portion 270 and the second rotating part 300.

The second power transmission portion 270 transfers the driving force from the second motor 240 to the second rotating part 300. The second power transmission portion 270 may include a second pinion 271, a second rotor 272, and a belt 273.

The second pinion 271 may rotate due to the driving force from the second motor 240. The belt 273 may transfer the rotational force from the second pinion 271 to the second rotor 272.

Referring to FIGS. 9 and 10, the second rotor 272, of the second power transmission portion 270, and the second target 260 may be coupled to the second rotating part 300. Here, the rotation axis of the second target 260 may coincide with the rotation axis Bx of the second rotating part 300.

When the second rotor 272 rotates due to the driving force from the second motor 240, the second rotating part 300 and the second target 260 may both rotate. The second target 260 may include the blades 261, which change the magnetic field generated by the second sensing portion 250. The blades 261 may be formed of a metal material. For example, the blades 261 may be formed of Al. If the blades 261 move within the magnetic field generated by the second sensing portion 250, the magnetic field may change.

Returning to FIG. 9, the main board 280 may be coupled to the second side frame 222. The main board 280 may be coupled to the rotating panel 210 by the second side frame 222.

The control device 290 may be coupled to the main board 280. The control device 290 may control the first motor 130 and the second motor 240 based on the sensing results of the first sensing portion 140 and the second sensing portion 250.

Figure 11:
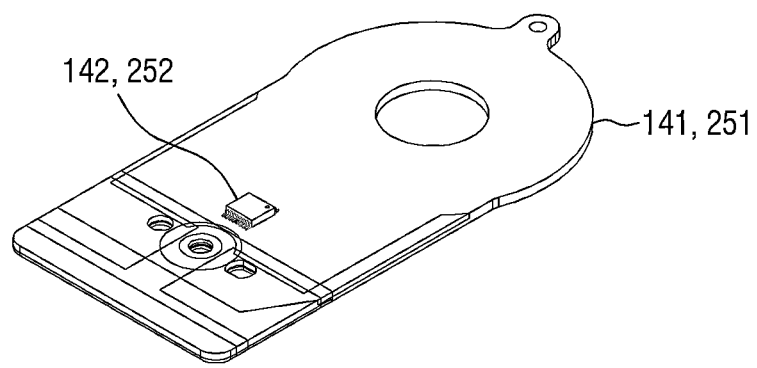
FIG. 11 is a perspective view of first and second sensing portions.
Figure 12:
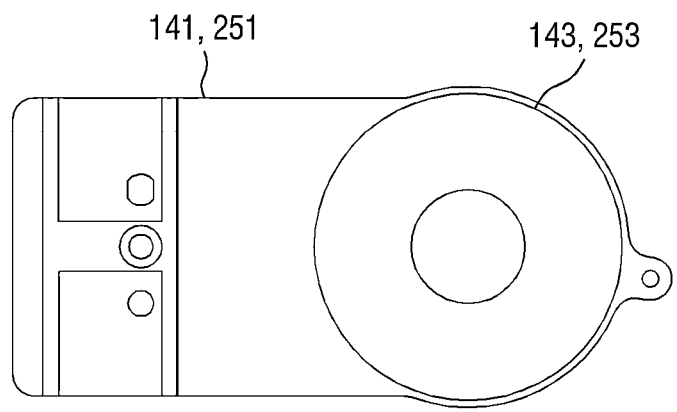
FIG. 12 is a bottom view of the first and second sensing portions.

FIG. 11 is a perspective view of the first sensing portion 140 and the second sensing portion 250, and FIG. 12 is a bottom view of the first sensing portion 140 and the second sensing portion 250.

Referring to FIGS. 11 and 12, the first sensing portion 140 and the second sensing portion 250 may include boards 141 and 251, respectively, the magnetic field sensors 142 and 252, respectively, and coils 143 and 253.

The boards 141 and 251 may secure the magnetic field sensors 142 and 252 and the coils 143 and 253. Moreover, the boards 141 and 251 may supply power to the magnetic field sensors 142 and 252 and current to the coils 143 and 253.

The coils 143 and 253 may generate a magnetic field. The coils 143 and 253 may be arranged on first sides of the boards 141 and 251 in a ring shape. As current is supplied to the coils 143 and 253, a magnetic field may be generated around the coils 143 and 253.

Figure 13:
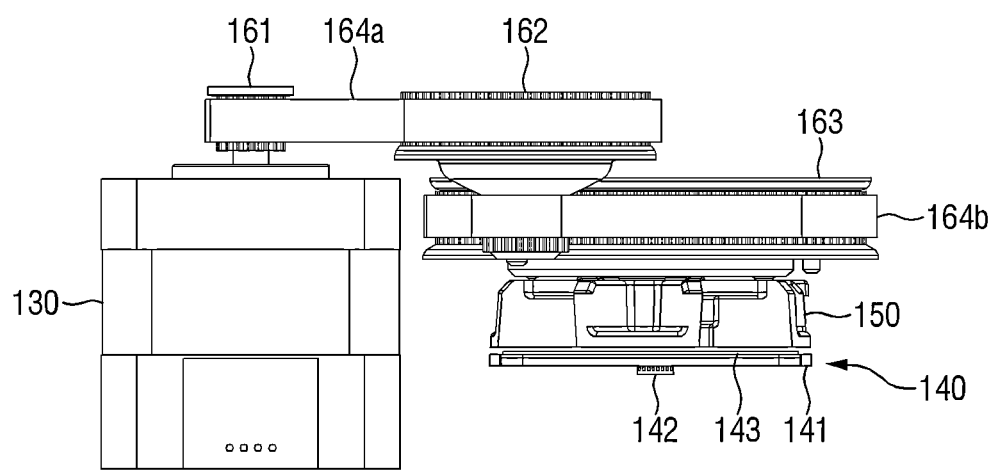
FIG. 13 is a schematic view for explaining how rotation of a first motor is detected by the first sensing portion.

FIG. 13 is a schematic view for explaining how the rotation of the first motor 130 is detected by the first sensing portion 140.

Referring to FIG. 13, the magnetic field sensor 142 may output a sensor value by detecting the magnetic field altered by the blades 151.

The coil 143 may be disposed on one side of the board 141 facing the blades 151. Due to the driving force of the first motor 130, the first target 150 may rotate together with the first rotor 163. As the first target 150 rotates, the blades 151 may move around the coil 143. If the blades 151 move around the coil 143, the magnetic field may change. The magnetic field sensor 142 may continuously sense the magnetic field around the coil 143 and output the sensor value as a sensing result. For example, the sensor value may correspond to the magnitude of the magnetic field. The range of such sensor values may correspond to the range of rotational angles of the first motor 130.

The first target 150 may include the blades 151. The magnetic field sensor 142 may sequentially output calculated sensor values for the respective blades 151 by detecting the magnetic field altered by the blades 151.

FIG. 13 illustrates how the rotation of the first motor 130 is detected by the first sensing portion 140. Similarly, the rotation of the second motor 240 may be detected by the second sensing portion 250.

Figure 14:
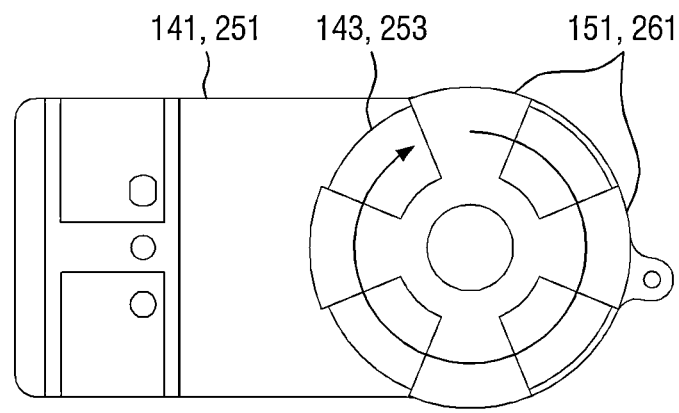
FIG. 14 is a schematic view illustrating rotation of blades by the first or second sensing portion.

FIG. 14 is a schematic view illustrating the rotation of the blades 151 or the blades 261 by the first sensing portion 140 or the second sensing portion 250, and FIG. 15 is a graph showing the relationship between sensor values from the magnetic field sensors 142 and 252 and the rotation angle of the first motor 130 and the second motor 240.

Referring to FIG. 14, the blades 151 or 261, which are equipped in the first target 150 or the second target 260, may rotate around the coil 143 or 253.

If current is supplied to the coil 143 or 253, a magnetic field may be formed around the coil 143 or 253. If the blades 151 or 261, which are formed of a metal material, rotate around the coil 143 or 253, the magnetic field may change.

The first target 150 or the second target 260 may include the blades 151 or 261. Since the blades 151 or 261 rotate around the coil 143 or 253, the rotation cycle of the first motor 130 or the second motor 240 may include multiple cycles of changes of the magnetic field. Referring to FIG. 15, the rotation cycle of the first motor 130 or the second motor 240, ranging from 0 to 360 degrees, may include multiple cycles of changes of the magnetic field.

The number of cycles of changes of the magnetic field included in the rotation cycle of the first motor 130 or the second motor 240 may correspond to the number of blades 151 or 261. For example, if there are four blades 151 or 261 included in the first target 150 or the second target 260, four cycles of changes of the magnetic field may be generated during one rotation of the first motor 130 or the second motor 240.

Since the rotation cycle of the first motor 130 or the second motor 240 includes multiple cycles of changes of the magnetic field, the rotation angle of the first motor 130 or the second motor 240 may not be determined solely based on the sensor value from the magnetic field sensor 142 or 252. Referring to FIG. 15, the calculated sensor values for the respective blades 151 or 261 may correspond to different partial rotation angle ranges, i.e., first through fourth partial rotation angle ranges RA1, RA2, RA3, and RA4, within the rotation angle range of the first motor 130 or the second motor 240. For example, if a sensor value S is detected by the magnetic field sensor 142 or 252, the rotation angle of the first motor 130 or the second motor 240 may be one of first through fourth predicted rotation angles A1, A2, A3, A4. The first through fourth predicted rotation angles A1 through A4 represent the rotation angles of the first motor 130 or the second motor 240 within each of the first through fourth partial rotation angle ranges RA1 through RA4 for a single sensor value.

Figure 16:
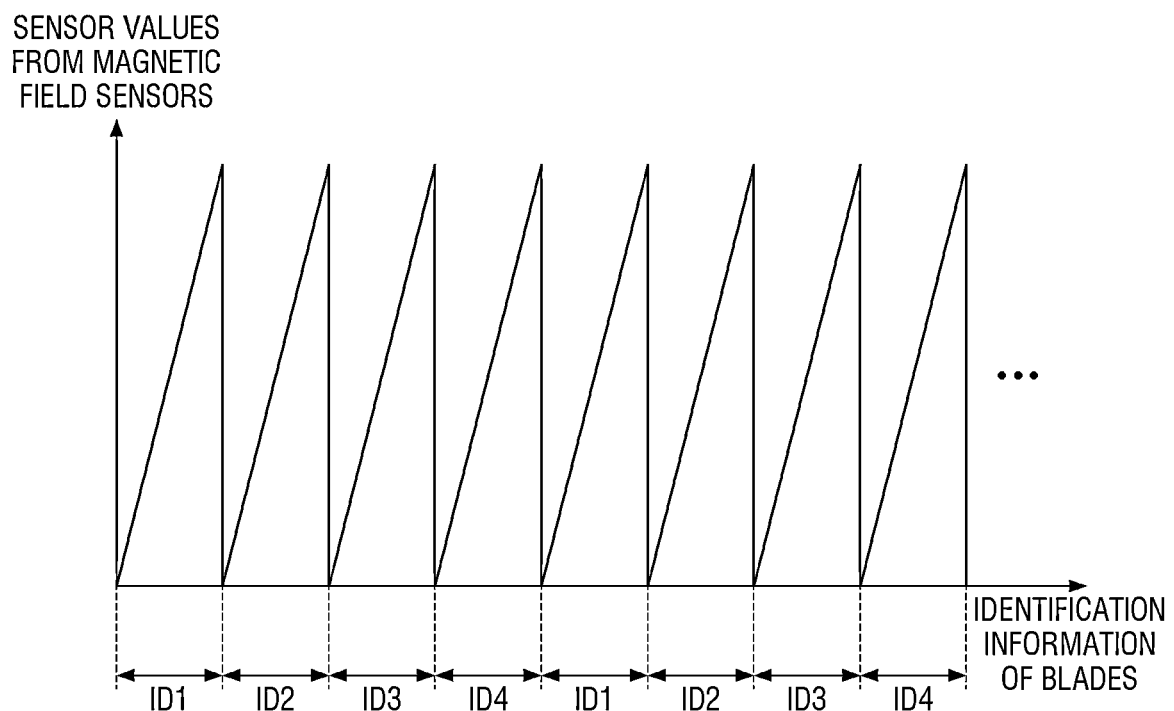
FIG. 16 is a graph showing identification information of the blades based on sensor values from the magnetic field sensor.
Figure 17:
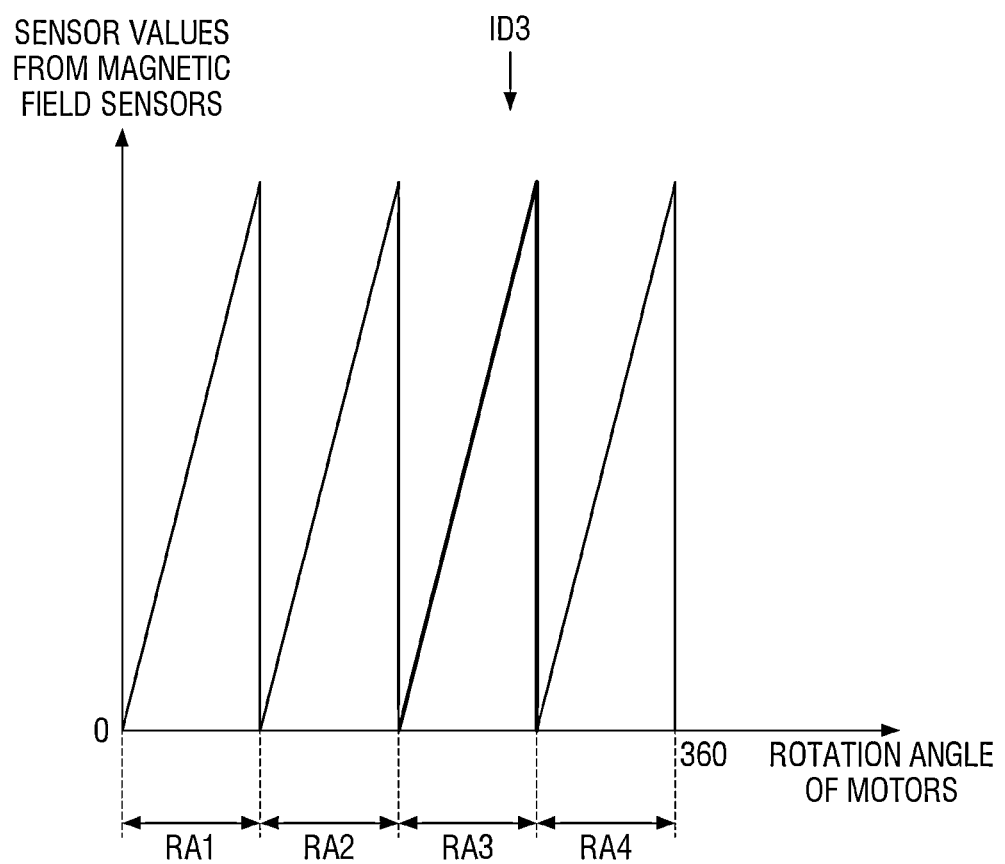
FIG. 17 is a graph for explaining how a reference angle range can be determined by referencing the identification information of the blades.
Figure 18:
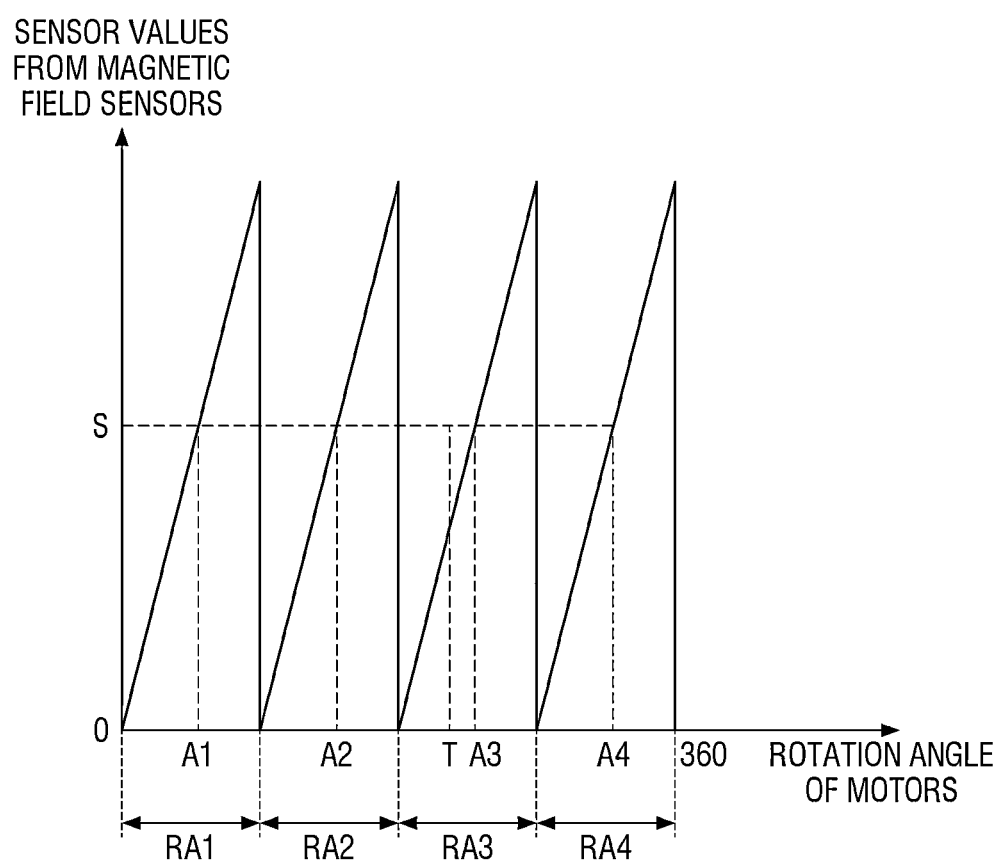
FIG. 18 is a graph for explaining how the rotation angle of the first or second motor can be determined by referencing calculated sensor values for the reference angle range.

FIG. 16 is a graph showing identification information of the blades 151 or 261 based on sensor values from the magnetic field sensor 142 or 252, FIG. 17 is a graph for explaining how a reference angle range can be determined by referencing the identification information of the blades 151 or 261, and FIG. 18 is a graph for explaining how the rotation angle of the first motor 130 or the second motor 240 can be determined by referencing calculated sensor values for the reference angle range.

Referring to FIG. 16, the control device 290 may identify the identifiers (IDs) ID1, ID2, ID3, and ID4 of the blades 151 or 261 by referencing the sensor value from the magnetic field sensor 142 or 252.

The magnetic field may be changed by one of the blades 151 or 261, resulting in an output sensor value. To determine the rotation angle of the first motor 130 or the second motor 240, a determination may be made as to which of the blades 151 or 261 has caused the change in the magnetic field that has resulted in the output sensor value. The blade 151 or 261 that has caused the change in the magnetic field will hereinafter be referred to as a reference blade. Once the reference blade is identified, a predicted rotation angle in one of the first through fourth partial angle ranges RA1 through RA4 that corresponds to the reference blade may be determined as the rotation angle of the first motor 130 or the second motor 240.

To identify the reference blade, the blades 151 or 261 may be counted while the first target 150 or the second target 260 is rotating. The control device 290 may continuously track the rotation of the first target 150 or the second target 260 to count the blades 151 or 261. Referring to FIG. 16, the magnetic field may be sequentially changed by different blades 151 or 261. The control device 290 may continuously track the rotation of the first target 150 or the second target 260 to identify the ID of the blade 151 or 261 currently changing the magnetic field.

Referring to FIGS. 17 and 18, the control device 290 may determine the rotation angle of the first motor 130 or the second motor 240 by referencing the identification information of the reference blade among the blades 151 or 261 in the first target 150 or the second target 260, as well as the sensing results from the first or second sensing portion 140 or 250.

If the magnetic field is changed by a third blade 151 or 261, the control device 290 may identify that the ID of the reference blade is "ID3."

The control device 290 may determine the partial angle range corresponding to the reference blade as a reference angle range for determining the rotation angle of the first motor 130 or the second motor 240. If the ID of the reference blade is "ID3," the partial angle range RA3 corresponding to the third blade 151 or 261 may be determined as the reference angle range. Then, the control device 290 may determine the predicted rotation angle A3, which corresponds to the partial angle range RA3, as the rotation angle of the first motor 130 or the second motor 240.

As previously stated, the rotation axis of the first target 150 may coincide with the rotation axis Ax of the first rotating part 200, and the rotation axis of the second target 260 may coincide with the rotation axis Bx of the second rotating part 300. The attitude of the target object may be determined through the rotation angle of the first motor 130 and/or the second motor 240 calculated using the sensor value from the magnetic field sensor 142 and/or 252.

When a target rotation angle is input through the input part 291, the motor driving part 294 may drive the first motor 130 or the second motor 240 to the target rotation angle. Ideally, if the target rotation angle is T, the actual rotation angle of the first motor 130 or the second motor 240 may also be T. However, a difference may arise between the target rotation angle and the actual rotation angle due to various factors.

If the third blade 151 or 261 is the reference blade, the target rotation angle T may be included in the third partial angle range RA3. Then, the control device 290 may determine the third partial angle range RA3 as the reference angle range.

Referring to FIG. 18, the control device 290 may calculate the predicted rotation angle of the first motor 130 or the second motor 240 corresponding to the sensor value output by the magnetic field sensor 142 or 252 for each of the first through fourth partial angle ranges RA1 through RA4, and may determine the calculated predicted rotation angle for the reference angle range as the rotation angle of the first motor 130 or the second motor 240.

If the sensor value output by the magnetic field sensor 142 or 252 is "S," the first through fourth predicted rotation angles A1 through A4 may be calculated for the first through fourth partial angle ranges RA1 through RA4, respectively. The first through fourth partial angle ranges RA1 through RA4 correspond to the blades 151 or 261. By counting the blades 151 or 261, the control device 290 may identify which of the first through fourth partial angle ranges RA1 through RA4 is the reference angle range. The control device 290 may determine the third partial angle range RA3 as the reference angle range based on the identification information of the reference blade and may determine the third predicted rotation angle A3 as the actual rotation angle of the first motor 130 or the second motor 240.

There may be a difference between the target rotation angle T and the actual rotation angle A3. If the difference exceeds a predefined threshold value, the control device 290 may control the first motor 130 or the second motor 240 again to compensate for the difference.

Specifically, the coordinates of the magnetic field sensor 142 or 252 may have four cycles within a designed rotation angle when the number of blades 151 or 261 is four. When one full rotation of the first motor 130 or the second motor 240 is 360 degrees, one of the four cycles of the magnetic field sensor 142 or 252 may have an angle of 90 degrees.

The rotation angle of the first motor 130 or the second motor 240 may be calculated using Equation (1) below:

$$m\text{-}deg = (\text{Blade Count}) \times (\text{Blade Angle}) + (e\text{-}deg/\text{Number of Blades}). \quad (1)$$

Referring to Equation (1), "m-deg" denotes the rotation angle of the first motor 130 or the second motor 240, and "Blade Count" denotes the reference blade corresponding to the reference angle range. The blades 151 or 261 may be counted by the control device 290, and "Blade Count" may be determined as a value between 0 and 3 when there are four blades 151 or 261.

Referring again to Equation (1), "Blade Angle" denotes the angle range of the blades 151 or 261. "Blade Angle" of Equation (1) may be calculated using Equation (2) below:

$$\text{Blade Angle} = \text{Designed Rotation Angle}/\text{Number of Blades}. \quad (2)$$

Referring to Equation (2), "Designed Rotation Angle" represents the rotation angle range of the first motor 130 or the second motor 240. If the first motor 130 or the second motor 240 is used for a pan operation of a camera, "Designed Rotation Angle" may be 360 degrees, and if the first motor 130 or the second motor 240 is used for a tilt operation of a camera, "Designed Rotation Angle" may be 180 degrees. For example, if the first motor 130 or the second motor 240 is used for a pan operation and the number of blades 151 or 261 is four, then "Blade Angle" may be 90 degrees (=360/4).

Referring back to Equation (1), e-deg denotes the rotation angle of the first motor 130 or the second motor 240 detected by the magnetic field sensor 142 or 252. The output value of the magnetic field sensor 142 or 252 may include a range from 0 to 2π radians. Referring to both Equations (1) and (2), "Number of Blades" denotes the number of blades 151 or 261.

Figure 19:
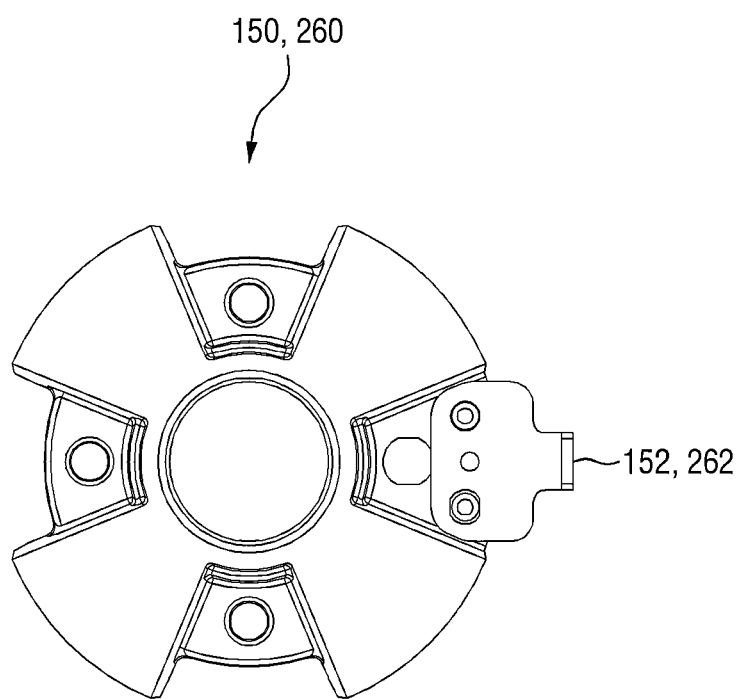
FIG. 19 illustrates a target equipped with an interrupter.
Figure 20:
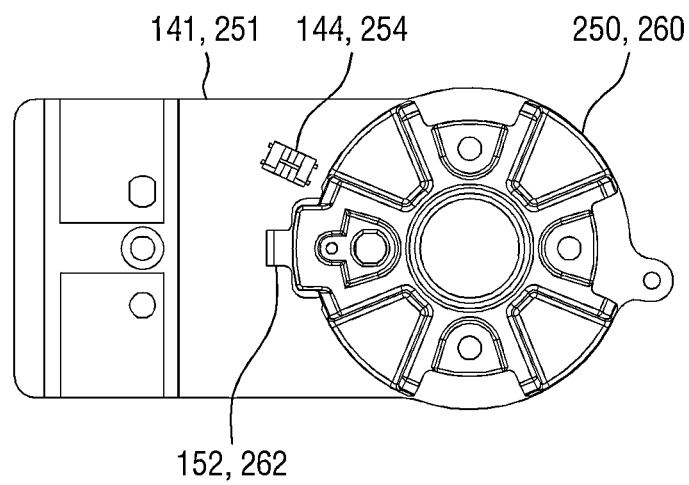
FIG. 20 is a schematic view for explaining how the interrupter is detected by a photo interrupter sensor.

FIG. 19 illustrates a target equipped with an interrupter, and FIG. 20 is a schematic view for explaining how the interrupter is detected by a photo interrupter sensor.

Referring to FIGS. 19 and 20, the first target 150 (or the second target 260) include an interrupter 152 (or an interrupter 262), and the first sensing portion 140 (or the second sensing portion 250) may include a photo interrupter sensor 144 (or a photo interrupter sensor 254).

The photo interrupter sensor 144 or 254 is fixed to a board 141 or 251 (e.g., a circuit board) and may be used to identify the initial angle of the first motor 130 or the second motor 240. The interrupter 152 or 262, which is equipped in the first target 150 or the second target 260, may be detected by the photo interrupter sensor 144 or 254. For example, whenever the first target 150 or the second target 260 rotates, the interrupter 152 or 262 may be detected by the photo interrupter sensor 144 or 254.

As previously described, the target object may include a camera. If the target object is a camera, the target rotation angle may be input to determine the shooting direction of the camera. To rotate the target object to the target rotation angle, the control device 290 may determine the current angle of the first motor 130 or the second motor 240. The control device 290 sets the current angle of the first motor 130 or the second motor 240 as the initial angle and rotates the target object to the target rotation angle based on the initial angle. For example, if the initial angle is 20 degrees and the target rotation angle is 280 degrees, the control device 290 may rotate the first motor 130 or the second motor 240 by an angle of 260 degrees.

The initial angle may be determined based on the point where the interrupter 152 or 262 is detected by the photo interrupter sensor 144 or 254. For example, the initial angle may represent the angle by which the first target 150 or the second target 260 has rotated from the point where the interrupter 152 or 262 is detected by the photo interrupter sensor 144 or 254.

FIG. 21 is a flowchart illustrating an attitude adjustment method according to an embodiment of the present disclosure.

Referring to FIG. 21, the control device 290 may adjust the attitude of the target object through feedback control.

Initially, the control device 290 may receive a control command for adjusting the attitude of the target object (operation S410). In response to the received control command, the control device 290 may activate the base part 100, the first motor 130, and the second motor 240, which are equipped in the first rotating part 200, in accordance with the received control command (operation S420), and may determine the rotation angle of the first motor 130 and the second motor 240 (operation S430). The rotation angle of the first motor 130 and the second motor 240 may be determined by referencing sensor values from the magnetic field sensors 142 and 252.

Furthermore, the control device 290 may adjust the attitude of the target object by referencing the rotation angle of the first motor 130 and the second motor 240 (operation S440). In other words, the control device 290 performs feedback control on the first motor 130 and the second motor 240 by referencing the sensing results from the first sensing portion 140 and the second sensing portion 250, i.e., the sensor values from the magnetic field sensors 142 and 252 until the rotation angle of the first motor 130 and the second motor 240 falls within a target threshold range.

The control device 290 may determine the rotation angle of the first motor 130 and the second motor 240 by referencing identification information of reference blades and detection results from the first sensing portion 140 and the second sensing portion 250. The control device 290 may continuously track the rotation of the first target 150 and the second target 260, perform counting for the blades 151 and the blades 261, and identify the identification information of the reference blades currently changing the magnetic field.

The identification information of the reference blades may correspond to one of a plurality of partial angle ranges. The control device 290 may determine a reference angle range corresponding to the identification information of the reference blades. Additionally, the control device 290 may calculate a predicted rotation angle of the first motor 130 and the second motor 240 corresponding to the sensor values output by the magnetic field sensors 142 and 252 for each of the partial angle ranges, and determine a calculated predicted rotation angle for the reference angle range as the rotation angle of the first motor 130 and the second motor 240.

Although non-limiting example embodiments of the present disclosure have been described with reference to the above and the accompanying drawings, those of ordinary skill in the art, to which the present disclosure pertains, understand that embodiments of the present disclosure may be implemented in other specific forms within the technical spirt of the present disclosure. Therefore, it should be understood that the example embodiments described above are illustrative and non-limiting in all respects.

What is claimed is:

1. An attitude adjustment apparatus comprising:
   a base part;
   a first rotating part rotatably coupled to the base part;
   a second rotating part configured to be fixedly coupled to a target object and rotatably coupled to the first rotating part; and
   a controller configured to adjust an attitude of the target object by controlling rotation of the first rotating part and the second rotating part, wherein the base part comprises:
a first motor configured to generate a first driving force;
a first sensing portion comprising a sensor, the first sensing portion configured to generate a first magnetic field and detect changes in the first magnetic field; and
a first target that is configured to be rotated by the first driving force of the first motor, the first target comprising a plurality of first blades that are configured to change the first magnetic field generated by the first sensing portion, wherein the first rotating part comprises:
a second motor configured to generate a second driving force;
a second sensing portion comprising a sensor, the second sensing portion configured to generate a second magnetic field and detect changes in the second magnetic field; and
a second target that is configured to be rotated by the second driving force of the second motor, the second target comprising a plurality of second blades that are configured to change the second magnetic field generated by the second sensing portion, and wherein the controller is further configured to:
determine a rotation angle of the first motor based on sensing results from the first sensing portion and identification information of a first reference blade, from among the plurality of first blades, that is causing the changes in the first magnetic field; and
determine a rotation angle of the second motor based on sensing results from the second sensing portion and identification information of a second reference blade, from among the plurality of second blades, that is causing the changes in the second magnetic field.

2. The attitude adjustment apparatus of claim 1, wherein
the sensor of the first sensing portion is a first magnetic field sensor configured to sense the changes in the first magnetic field caused by the plurality of first blades, and sequentially output first sensor values respectively obtained for the plurality of first blades,
the sensor of the second sensing portion is a second magnetic field sensor configured to sense the changes in the second magnetic field caused by the plurality of second blades and sequentially output second sensor values respectively obtained for the plurality of second blades,
the first sensing portion further comprises a first coil configured to generate the first magnetic field, and a first board that fixes the first coil and the first magnetic field sensor, and
the second sensing portion further comprises a second coil configured to generate the second magnetic field, and a second board that fixes the second coil and the second magnetic field sensor.

3. The attitude adjustment apparatus of claim 2, wherein
the first sensor values obtained for the plurality of first blades respectively correspond to different first partial angle ranges of a first rotation angle range of the first motor, each of the first partial angle ranges corresponds to a respective one of the plurality of first blades,
the second sensor values obtained for the plurality of second blades respectively correspond to different second partial angle ranges of a second rotation angle range of the second motor, each of the second partial angle ranges corresponds to a respective one of the plurality of second blades, and the controller is further configured to:
determine one of the first partial angle ranges, that corresponds to the first reference blade, as a reference angle range for determining the rotation angle of the first motor;
determine one of the second partial angle ranges, that corresponds to the second reference blade, as a reference angle range for determining the rotation angle of the second motor.

4. The attitude adjustment apparatus of claim 3, wherein the controller is further configured to:
calculate a plurality of first predicted rotation angles of the first motor based on a third sensor value output by the first magnetic field sensor, and determine one of the plurality of first predicted rotation angles as the rotation angle of the first motor, each of the plurality of first predicted rotation angles being within a respective one of the first partial angle ranges; and
calculate a plurality of second predicted rotation angles of the second motor based on a fourth sensor value output by the second magnetic field sensor, and determine one of the plurality of second predicted rotation angles as the rotation angle of the second motor, each of the plurality of second predicted rotation angles being within a respective one of the second partial angle ranges.

5. The attitude adjustment apparatus of claim 2, wherein
the first sensing portion further comprises a first photo interrupter sensor that is fixed to the first board and configured to identify an initial angle of the first motor, and
the second sensing portion further comprises a second photo interrupter sensor that is fixed to the second board and configured to identify an initial angle of the second motor.

6. The attitude adjustment apparatus of claim 5, wherein
the first target comprises a first interrupter that is configured to be detected by the first photo interrupter sensor, and
the second target comprises a second interrupter that is configured to be detected by the second photo interrupter sensor.

7. The attitude adjustment apparatus of claim 5, wherein the controller is further configured to:
receive a first target rotation angle of the first motor, and control the first motor to rotate to the first target rotation angle based on the initial angle of the first motor; and
receive a second target rotation angle of the second motor, and control the second motor to rotate to the second target rotation angle based on the initial angle of the second motor.

8. The attitude adjustment apparatus of claim 1, wherein
the first target of the base part is coupled to the first rotating part, and
the second target of the first rotating part is coupled to the second rotating part.

9. The attitude adjustment apparatus of claim 1, wherein
a rotation axis of the first target of the base part coincides with a rotation axis of the first rotating part, and
a rotation axis of the second target of the first rotating part coincides with a rotation axis of the second rotating part.

10. The attitude adjustment apparatus of claim 1, wherein
the base part comprises a base cover,
the first rotating part comprises a rotating panel that is configured to rotate on the base cover, and the first target of the base part is coupled to the rotating panel.

11. The attitude adjustment apparatus of claim 1, wherein the first motor of the base part is configured to rotate the first rotating part with the first driving force, and
the second motor of the first rotating part is configured to rotate the second rotating part with the second driving force.

12. The attitude adjustment apparatus of claim 1, wherein a rotation axis of the first rotating part and a rotation axis of the second rotating part are in different directions from each other.

13. The attitude adjustment apparatus of claim 1, wherein the first rotating part is configured to infinitely rotate relative to the base part, and
the second rotating part is configured to rotate only within a predetermined angle range relative to the first rotating part.

14. The attitude adjustment apparatus of claim 1, wherein the second rotating part is a housing that is configured to accommodate the target object.

15. An attitude adjustment method for adjusting attitude of a target object of an attitude adjustment apparatus, the attitude adjustment method comprising:
receiving a control command for adjusting the attitude of the target object; and
adjusting the attitude of the target object by controlling, in response to the control command, rotation of a first rotating part of the attitude adjustment apparatus, relative to a base part of the attitude adjustment apparatus, and a second rotating part of the attitude adjustment apparatus, relative to the first rotating part,
wherein the base part is coupled to the second rotating part,
wherein the base part includes:
a first motor configured to generate a first driving force;
a first sensing portion including a sensor, the first sensing portion configured to generate a first magnetic field and detect changes in the first magnetic field; and
a first target that is configured to be rotated by the first driving force of the first motor, the first target including a plurality of first blades that are configured to change the first magnetic field generated by the first sensing portion,
wherein the first rotating part includes:
a second motor configured to generate a second driving force;
a second sensing portion including a sensor, the second sensing portion configured to generate a second magnetic field and detect changes in the second magnetic field; and
a second target that is configured to be rotated by the second driving force of the second motor, the second target including a plurality of second blades that are configured to change the second magnetic field generated by the second sensing portion, and
wherein the adjusting the attitude of the target object comprises:
determining a rotation angle of the first motor based on sensing results from the first sensing portion and identification information of a first reference blade, from among the plurality of first blades, that is causing the changes in the first magnetic field; and
determining a rotation angle of the second motor based on sensing results from the second sensing portion and identification information of a second reference blade, from among the plurality of second blades, that is causing the changes in the second magnetic field.

16. The attitude adjustment method of claim 15, wherein the sensor of the first sensing portion is a first magnetic field sensor configured to sense the changes in the first magnetic field caused by the plurality of first blades, and sequentially output first sensor values respectively obtained for the plurality of first blades,
the sensor of the second sensing portion is a second magnetic field sensor configured to sense the changes in the second magnetic field caused by the plurality of second blades and sequentially output second sensor values respectively obtained for the plurality of second blades,
the first sensing portion further includes a first coil configured to generate the first magnetic field, and a first board that fixes the first coil and the first magnetic field sensor, and
the second sensing portion further includes a second coil configured to generate the second magnetic field, and a second board that fixes the second coil and the second magnetic field sensor.

17. The attitude adjustment method of claim 16, wherein the first sensor values obtained for the plurality of first blades respectively correspond to different first partial angle ranges of a first rotation angle range of the first motor, each of the first partial angle ranges corresponds to a respective one of the plurality of first blades,
the second sensor values obtained for the plurality of second blades respectively correspond to different second partial angle ranges of a second rotation angle range of the second motor, each of the second partial angle ranges corresponds to a respective one of the plurality of second blades, and
the adjusting the attitude of the target object further comprises:
determining one of the first partial angle ranges, that corresponds to the first reference blade, as a reference angle range for determining the rotation angle of the first motor;
determining one of the second partial angle ranges, that corresponds to the second reference blade, as a reference angle range for determining the rotation angle of the second motor.

18. The attitude adjustment method of claim 17, wherein the adjusting the attitude of the target object further comprises:
calculating a plurality of first predicted rotation angles of the first motor based on a third sensor value output by the first magnetic field sensor, and determine one of the plurality of first predicted rotation angles as the rotation angle of the first motor, each of the plurality of first predicted rotation angles being within a respective one of the first partial angle ranges; and
calculating a plurality of second predicted rotation angles of the second motor based on a fourth sensor value output by the second magnetic field sensor, and determine one of the plurality of second predicted rotation angles as the rotation angle of the second motor, each of the plurality of second predicted rotation angles being within a respective one of the second partial angle ranges.

19. The attitude adjustment method of claim 16, wherein
the first sensing portion further includes a first photo interrupter sensor that is fixed to the first board and configured to identify an initial angle of the first motor, and the second sensing portion further includes a second photo interrupter sensor that is fixed to the second board and configured to identify an initial angle of the second motor.

20. The attitude adjustment method of claim 19, wherein the adjusting the attitude of the target object further comprises:

receiving a first target rotation angle of the first motor, and controlling the first motor to rotate to the first target rotation angle based on the initial angle of the first motor; and receiving a second target rotation angle of the second motor, and controlling the second motor to rotate to the second target rotation angle based on the initial angle of the second motor.

* * * * *